United States Patent [19]

Ick et al.

[11] 4,256,849
[45] Mar. 17, 1981

[54] PROCESS FOR THE PRODUCTION OF COLD SETTING FOAMS WHICH CONTAIN URETHANE GROUPS PREPARED FROM A MIXTURE OF 4,4-DIPHENYL METHANE DIISOCYANATE AND 2,4-DIPHENYL METHANE DIISOCYANATE

[75] Inventors: Jürgen Ick, Coraopolis, Pa.; Hans J. Meiners; Günter Oertel, both of Leverkusen; Günter Hauptmann, Odenthal; Klaus König, Leverkusen, all of Fed. Rep. of Germany

[73] Assignee: Bayer Aktiengesellschaft, Bayerwerk, Fed. Rep. of Germany

[21] Appl. No.: 103,636

[22] Filed: Dec. 14, 1979

Related U.S. Application Data

[63] Continuation of Ser. No. 972,615, Dec. 22, 1978, abandoned, which is a continuation-in-part of Ser. No. 843,921, Oct. 20, 1977, abandoned.

[30] Foreign Application Priority Data

Oct. 21, 1976 [DE] Fed. Rep. of Germany ....... 2647482
Apr. 21, 1977 [DE] Fed. Rep. of Germany ....... 2717653

[51] Int. Cl.$^3$ .................... C08G 18/18; C08G 18/20
[52] U.S. Cl. .................................... 521/129; 521/160
[58] Field of Search ............................. 521/160, 129

[56] References Cited

U.S. PATENT DOCUMENTS

| | | | |
|---|---|---|---|
| 3,277,173 | 10/1966 | Powers et al. | 260/570 D |
| 3,362,979 | 1/1968 | Bentley | 260/453 |
| 3,857,890 | 12/1974 | Recchia et al. | 260/570 D |
| 4,066,579 | 1/1978 | Yukuta et al. | 521/176 |

FOREIGN PATENT DOCUMENTS 2425657 12/1974 Fed. Rep. of Germany .

*Primary Examiner*—Maurice J. Welsh
*Attorney, Agent, or Firm*—Gene Harsh; Joseph C. Gil; Lyndanne M. Whalen

[57] ABSTRACT

The instant invention is directed to a process for the production of cold setting, flexible foams which contain urethane groups by the reaction of polyethers with a molecular weight of 400 to 10,000 which contain at least two hydroxyl groups and in which at least 10% by weight of the hydroxyl groups are primary hydroxyl groups, with a mixture of diphenyl methane diisocyanates and oligomeric polyphenyl-polymethylene polyisocyanates in the presence of blowing agents and optionally in the presence of catalysts and other foaming aids, the improvement wherein the mixture of diphenyl methane diisocyanates and polyphenyl-polymethylene polyisocyanate mixtures is substantially free of carbodiimide groups, has an isocyanate content greater than 30%, and contains from 60 to 90% by weight of 4,4' diphenyl methane diisocyanate and from 3 to 30% by weight of 2,4' diphenyl methane diisocyanate.

3 Claims, No Drawings

PROCESS FOR THE PRODUCTION OF COLD SETTING FOAMS WHICH CONTAIN URETHANE GROUPS PREPARED FROM A MIXTURE OF 4,4-DIPHENYL METHANE DIISOCYANATE AND 2,4-DIPHENYL METHANE DIISOCYANATE

This is a continuation application of Ser. No. 972,615 filed Dec. 22, 1978, which in turn was a continuation-in-part of U.S. application Ser. No. 843,921 filed Oct. 20, 1977, both of which are now abandoned.

BACKGROUND OF THE INVENTION

Foams which contain urethane groups are widely used, for example, in the field of insulation for the manufacture of structural elements and for upholstery purposes. It is known that cold setting foams which contain urethane groups can be produced from higher molecular weight polyols such as hydroxyl polyethers, special polyisocyanates, water and/or other blowing agents, optionally in the presence of catalysts and other auxiliary agents. The higher molecular weight polyols used are frequently polyethers, for example, having molecular weights of 400-10,000, which contain at least two hydroxyl groups and in which at least about 10% of the hydroxyl groups are primary hydroxyl groups. These polyethers are used, for example, in combination with special polyisocyanates. The special isocyanates used may be, for example, a mixture of diphenyl methane diisocyanates and polyphenyl-polymethylene polyisocyanates.

The previously known cold setting foams based on polyphenyl-polymethylene polyisocyanates, for example, those described in German Offenlegungsschrift No. 2,425,657, (see particularly Examples 1-5) have a serious disadvantage, which is particularly disturbing when the foams are produced inside molds. Thus, even when the reaction mixture has been inside the mold for about 10 minutes, the foams formed during this time are still irreversibly deformable. Although this tendency to deformation can be overcome by storage of the reaction mixture for about 24 hours or by subsequent heating of the foams after their removal from the mold, for about thirty minutes at 120° C., it is always a disadvantageous characteristic. Furthermore, molding times of less than five minutes cannot generally be achieved.

An improved process for the production of cold setting, flexible foams which contain urethane groups has now been found. This process reduces or substantially obviates the disadvantages described above and is based on the use of a certain mixture of diphenyl methane diisocyanates and oligomer polyphenyl-polymethylene polyisocyanates.

DESCRIPTION OF THE INVENTION

The present invention thus relates to a process for the production of cold setting, flexible foams and the foams produced thereby, which foams contain urethane groups by the reaction of polyethers with a molecular weight of 400 to 10,000 which contain at least two hydroxyl groups and in which at least 10% by weight of the hydroxyl groups are primary hydroxyl groups with a mixture of diphenyl methane diisocyanates and oligomer polyphenol-polymethylene polyisocyanates in the presence of blowing agents and optionally in the presence of catalysts and other foaming aids, characterized in that the mixture of diphenyl methane diisocyanates and polyphenyl-polymethyene polyisocyanates is substantially free (content less than 3% by weight) of carbodiimide groups, has an isocyanate content greater than 30%, and, contains from 60 to 90% by weight, preferably 65-80% by weight of 4,4' diphenyl methane diisocyanate and from 3 to 30% by weight, preferably 10-30% by weight of 2,4' diphenyl methane diisocyanate. The amount of polyphenyl-polymethylene polyisocyanates in this isocyanate mixture is from 0-37% by weight, preferably from 10-20% by weight.

The invention has surprisingly been found to show the following practical advantages:

(1) Due to the very rapid hardening of these foam systems, molding times of between 3 minutes and less than 1 minute can be obtained.

(2) The rapid hardening substantially reduces the tendency of the foam to deformation, so that any intermediate storage time can be considerably reduced. Reheating of the molded articles after removal from the mold is no longer necessary. The foams can be packaged after 10 minutes without risk of deformation.

The polyisocyanate mixture itself is known in the art. In addition to the polyisocyanate mixture used according to the invention, other isocyanates may be used as starting materials in quantities of up to 20% by weight, based on the quantity of polyisocyanate mixture according to the invention. These additional, optional, isocyanates include aliphatic, cycloaliphatic and other aromatic and heterocyclic polyisocyantes such as those described, for example, by W. Siefken in Justus Liebigs Annalen der Chemie 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane as described in German Auslegeschrift No. 1,202,785 and U.S. Pat. No. 3,401,190; 2,4- and 2,6-hexahydrotolylene diisocyanate and mixtures of these isomers; hexahydro-1,3- and/or -1,4-phenylene diisocyanate; perhydro-2,4'-and/or -4,4'-diphenylmethane diisocyanate; 1,3- and 1,4-phenylene diisocyanate; 2,4- and 2,6-tolylene diisocyanate and mixtures of these isomers; naphthylene-1,5-diisocyanate; triphenylmethane-4,4',4"-triisocyanate; m- and p-isocyanato-phenylsulphonyl isocyanate as described in U.S. Pat. No. 3,454,606; perchlorinated aryl polyisocyanates as described, for example, in German Auslegeschrift No. 1,157,601 and U.S. Pat. No. 3,277,138; the diisocyanates described in U.S. Pat. No. 3,492,330; polyisocyanates having allophanate groups as described, e.g., in British Pat. No. 994,890; Belgian Pat. No. 761,626 and published Dutch Patent Application No. 7,102,524; polyisocyanates having isocyanurate groups as described, for example, in U.S. Pat. No. 3,001,973, German Pat. Nos. 1,022,789; 1,222,067 and 1,027,394, and in German Offenlegungsschriften Nos. 1,929,034 and 2,004,048; polyisocyanates having urethane groups, e.g., as described in Belgian Pat. No. 752,261 and in U.S. Pat. No. 3,394,164; polyisocyanates having acylated urea groups, as described in German Pat. No. 1,230,778; polyisocyanates having biuret groups, e.g., as described in German Pat. No. 1,101,394, U.S. Pat. Nos. 3,124,605 and 3,201,372, and in British Pat. No. 889,050; polyisocyanates prepared by telomerization reactions, as described, for example, in U.S. Pat. No. 3,654,106; polyisocyanates with ester groups, e.g., such as those described in British Pat. Nos. 965,474 and 1,072,956, U.S. Pat. No. 3,567,763 and German Pat. No.

1,231,688; reaction products of the above-mentioned isocyanates with acetals, as described in German Pat. No. 1,072,385; and polyisocyanates containing polymeric fatty acid groups, as described in U.S. Pat. No. 3,455,883.

The distillation residues obtained from the commercial production of isocyanates and still containing isocyanate groups may also be used, if desired as solutions in one or more of the above-mentioned polyisocyanates. Any mixtures of the above-mentioned polyisocyanates may, of course, be used.

Monofunctional isocyanates, such as propyl isocyanate, cyclohexyl isocyanate, phenyl isocyanate, tolyl isocyanate and p-chlorophenyl isocyanate may also be included.

Polyethers containing at least two hydroxyl groups and generally having a molecular weight of from 400 to 10,000 are also used as a starting component according to the invention. Particularly preferred polyethers containing from 2–8, preferably 2–4 hydroxyl groups and 20 especially those with a molecular weight of from 800 to 10,000, and most preferably 1,000 to 6,000. At least 10%, by weight, of the hydroxyl groups in these polyethers are primary hydroxyl groups.

These polyethers are known in the art and may be prepared, for example, by the polymerization of epoxides, such as ethylene oxide, propylene oxide, butylene oxide, tetrahydrofuran, styrene, oxide or epichlorohydrin, alone, e.g., in the presence of boron trifluoride, or by addition of these epoxides, either as mixtures or successively, to starting components with respective hydrogen atoms. Suitable starting components include water, alcohols, ammonia or amines. Suitable examples include ethylene glycol; propylene glycol-(1,3) or -(1,2); trimethylolpropane; glycerol, 4,4'-dihydroxydiphenylpropane, aniline, ethanolamine; ethylenediamine; and the like. In these polyethers, the primary hydroxyl (end) groups are preferably formed by the reaction of ethylene oxide. Sucrose polyethers may also be used according to the invention, for example, those described in German Auslegeschriften Nos. 1,176,358 and 1,064,938. Polyethers modified by vinyl polymers, for example, the compounds obtained by the polymerization of styrene and acrylonitrile in the presence of polyethers, as described in U.S. Pat. Nos. 3,383,351; 3,304,273; 3,503,093 and 3,110,695 and German Pat. No. 1,152,536 and polybutadienes which contain hydroxyl groups are also suitable.

The starting components which may be used according to the invention in addition to the polyethers may also include in quantities of up to 50%, by weight, based on the polyethers, hydroxyl polyesters, hydroxyl polyethers which are substantially free from primary hydroxyl groups, hydroxyl polythioethers, hydroxyl polyacetals, hydroxyl polycarbonates and hydroxyl polyester amides, all of which are known in the art for the production of both homogeneous and cellular polyurethanes. These hydroxyl polymers contain at least two hydroxyl groups, generally 2 to 8, preferably 2 to 4 hydroxyl groups and they generally have molecular weights of from 400 to 10,000, preferably 800 to 10,000 and most preferably 1,000 to 6,000.

Suitable polyesters with hydroxyl groups include, for example, the reaction products of polyhydric, preferably dihydric alcohols to which trihydric alcohols, may be added and polybasic, preferably dibasic carboxylic acids. Instead of free polycarboxylic acids, the corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms and/or unsaturated. The following are mentioned as examples of useful acidic materials: succinic acid, adipic acid, suberic acid, azelaic acid, sebacic acid, phthalic acid, isophthalic acid, trimellitic acid, phthalic acid anhydride, tetrahydrophthalic acid anhydride; hexahydrophthalic acid anhydride; tetrachlorophthalic acid anhydride; endomethylene tetrahydrophthalic acid anhydride; glutaric acid anhydride; maleic acid, maleic acid anhydride, fumaric acid, dimeric and trimeric fatty acids such as oleic acid which may be mixed with monomeric fatty acids; dimethyl terephthalate and terephthalic acid-bis-glycol esters, and the like. The following are examples of suitable polyvalent alcohols: ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol, polybutylene glycols and the like. The polyesters may also contain a proportion of carboxyl end groups. Polyesters of lactones such as $\omega$-caprolactone or hydroxycarboxylic acids such as $\omega$-hydroxy-caproic acid may also be used.

The optional hydroxyl polyethers used according to the invention which have at least 2, generally 2 to 8 and preferably 2 to 3 hydroxyl groups (which are not primary hyroxyl groups) are also known and are prepared, for example, by polymerization of epoxides such as ethylene oxides, propylene oxide, butylene oxide, tetrahydrofuran, styrene oxide or epichlorohydrin, either alone, e.g., in the presence of boron trifluoride, or by addition of these epoxides, either as mixtures or successively, to starting components having reactive hydrogen atoms, such as water, alcohols, ammonia or amines. Suitable starting components include ethylene glycol, propylene glycol-(1,3) or -(1,2), trimethylolpropane, 4,4'-dihydroxy diphenylpropane, aniline, ethanolamine, ethylene diamine and the like. Sucrose polyethers may also be used according to the invention, e.g., those described in German Auslegeschriften Nos. 1,176,358 and 1,064,938. All these polyethers are substantially free from primary hydroxyl groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known in the art. Such as, for examples, those which can be prepared by the reaction of diols such as propanediol-(1,3), butanediol-(1,4) and/or hexanediol-(1,6), diethylene glycol, triethylene glycol or tetraethylene glycol with diarylcarbonates, e.g., with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the invention.

Representatives of the many compounds which may be used according to the invention are known and have been described, for example, in High Polymers, Volume XVI, "Polyurethanes, Chemistry and Technology" by Saunders-Frisch, Interscience Publishers, New York, London, Volume I, 1962, pages 32–42 and pages 44–45 and Volume II, 1964, pages 5–6 and 198–199 and in Kunststoff-Handbuch, Volume VII, Vieweg-Hochtlen, Carl-Hanser-Verlag, Munich, 1966, e.g., on pages 45 to 71.

Mixtures of the above-mentioned compounds which contain at least two hydrogen atoms capable of reacting with isocyanates and have a molecular weight of from 400 to 10,000 may, of course, also be used, for example, mixtures of polyethers and polyesters.

The starting components used according to the invention may also include compounds with a molecular weight of from 32 to 400 which have at least two hydrogen atoms capable of reacting with isocyanates in amounts of up to 50%, by weight, based on the weight of primary hydroxyl group containing polyethers. These materials include compounds containing hydroxyl groups and/or amino groups and/or thiol groups and/or carboxyl groups, preferably hydroxyl groups and/or amino groups, and they serve as chain-lengthening agents or cross-linking agents. They generally have from 2 to 8 hydrogen atoms capable of reacting with isocyanates, preferably 2 or 3 such hydrogen atoms. The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethyl-cyclohexane, 2-methyl-1,3-propanediol, glycerol, trimethylol propane, hexanetriol-(1,2,6), trimethylolethane, pentaerythritol, quinitol, mannitol and sorbitol, diethylene glycol, triethylene glycol, tetraethylene glycol, polyethylene glycols with a molecular weight of up to 400, dipropylene glycol, polypropylene glycols with a molecular weight of up to 400, dibutylene glycol, polybutylene glycols with a molecular weight of up to 400, 4,4'-dihydroxy-diphenyl propane, dihydroxymethyl-hydroquinone, ethanolamine, diethanolamine, triethanolamine, 3-aminopropanol, ethylene diamine, 1,3-diaminopropane, 1-mercapto-3-aminopropane, 4-hydroxyphthalic acid, 4-aminophthalic acid, succinic acid, adipic acid, hydrazine, N,N-dimethylhydrazine, 4,4'-diaminodiphenylmethane, tolylenediamine, methylene-bis-chloraniline, methylene-bis-anthranilic acid ester, diaminobenzoic acid esters, the isomeric chlorophenylene diamines, and the like.

In this case, again there may be used mixtures of various compounds having a molecular weight of from 32 to 400 and containing at least two hydrogen atoms capable of reacting with isocyanates.

According to the invention, polyhydroxyl compounds in which high molecular weight polyadducts or polycondensates are finely dispersed or dissolved may also be used in quantities of up to 50% by weight based on the primary hydroxyl group containing polyether. These modified polyhydroxyl compounds are obtained when polyaddition reactions, e.g., reactions between polyisocyanates and amino functional compounds, or polycondensation reactions, e.g., between formaldehyde and phenols and/or amines, are carried out in situ in any of the above-mentioned hydroxyl compounds. Processes of this kind have been described, for example, in German Auslegeschriften Nos. 1,168,075 and 1,260,142 and in German Offenlegungsschriften Nos. 2,324,134; 2,423,984; 2,512,385; 2,513,185; 2,550,796; 2,550,797; 2,550,833 and 2,550,862. Alternatively, these modified polyhydroxyl compounds may be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

According to the invention, water and/or readily volatile organic substances are used as blowing agents. Suitable organic blowing agents include, for example, acetone, ethyl acetate and halogen substituted alkanes such as methylene chloride, chloroform, ethylidene chloride, vinylidene chloride, monofluorotrichloromethane, chlorodifluoromethane, and dichlorodifluoromethane as well as butane, hexane, heptane and diethyl ether. The effect of a blowing agent can also be obtained by the addition of compounds which decompose at temperatures above room temperature to release gases such as nitrogen, e.g., azo compounds such as azoisobutyric acid nitrile. Further examples of blowing agents and the use of blowing agents are known and have been described, e.g., in Kunststoff-Handbuch, Volume VII, published by Vieweg and Hochtlen, Carl-Hanser-Verlag, Munich 1966, e.g., on pages 108 and 109, 432 to 455 and 507 to 510.

Catalysts are also frequently used according to the invention. The catalysts added are generally known and include tertiary amines such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. Mannich bases known per se obtained from secondary amines such as dimethylamine and aldehydes, preferably formaldehyde, or ketones such as acetone, methyl ethyl ketone or cyclohexanone and phenols such as phenol, nonylphenol or bis-phenol may also be used as catalysts. Examples of catalysts which consist of tertiary amines having hydrogen atoms which are reactive with isocyanate groups include triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines having carbon-silicon bonds as described, e.g., in German Pat. No. 1,229,290 and U.S. Pat. No.

3,620,984 may also be used as catalysts. Examples include 2,2,4-trimethyl-2-silamorpholine and 1,3-diethylaminoethyltetramethyldisiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

Further examples of catalysts which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

The catalysts, when used, are generally used in a quantity of between about 0.001 and 10%, by weight, based on the quantity of primary hydroxyl group containing polyethers.

Surface active additives such as emulsifiers and foam stabilizers may also be used according to the invention. Suitable emulsifiers include, e.g., the sodium salts of ricinoleic sulphonates or salts of fatty acids with amines such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

Polyether siloxanes are particularly suitable foam stabilizers, especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748; 2,917,480 and 3,629,308. It may, however, be advantageous to carry out the process according to the invention without foam stabilizers.

Other additives which may also be used according to the invention include reaction retarders, e.g., substances which are acid in reaction such as hydrochloric acid or organic acid halides, cell regulators such as paraffins or fatty alcohols or dimethyl polysiloxanes, pigments, dyes, flame retarding agents such as tris-chloroethyl phosphate, tricresyl phosphate or ammonium phosphate and polyphosphates, stabilizers against ageing and weathering, plasticizers, fungistatic and bacteriostatic substances, and fillers such as barium sulphate, kieselguhr, carbon black or whiting.

Other examples of surface active additives, foam stabilizers, cell regulators, reaction retarders, stabilizers, flame retarding substances, plasticizers, dyes, fillers, and fungistatic and bacteriostatic substances which may be used according to the invention and details concerning the use and mode of action of these additives are known and may be found, e.g., in Kunststoff-Handbuch, Volume VII, published by Vieweg and Hochtlen, Carl-Hanser-Verlag, Munich 1966, on pages 103 to 113.

According to the invention, the components may be reacted together by the known one-shot prepolymer or semiprepolymer process, often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich 1966, pages 121 and 205.

According to the invention, the foaming reaction for producing foam products is often carried out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing just sufficient foamable reaction mixture to fill the mold with foam after the reaction is completed.

So-called external mold release agents known in the art, such as silicone oils, are frequently used when foaming is carried out inside molds. The process may also be carried out with the aid of so-called internal mold release agents, if desired, in combination with external mold release agents, e.g., as described in German Offenlegungsschriften Nos. 2,121,670 and 2,307,589.

Cold setting foams may also be produced, as described in British Pat. No. 1,162,517 and German Offenlegungsschrift No. 2,153,086.

Foams may, of course, also be produced by the process of block foaming or by the laminator process known in the art. The products obtainable according to the invention may be used, for example, as upholstery or padding materials.

EXAMPLES

In all examples metal molds were used. Foaming was carried out at a mold temperature of 50° C.

EXAMPLE 1 (Comparison Example)

(A) 100 parts by weight of a polypropylene glycol which had been started on trimethylolpropane and modified with ethylene oxide, having a hydroxyl number of 28 with 80% of primary hydroxyl end groups, 3.2 parts by weight of water, 0.15 parts by weight of 1,4 diazabicyclo-2,2,2-octane, 0.10 parts by weight of 2,2'dimethylamino diethyl ether, and 5 parts by weight of trichlorofluoromethane and (B) 54.8 parts by weight of a polyisocyanate mixture consisting of 34% by weight of 2,4' diphenyl methane diisocyanate, 51% by weight of 4,4' diphenyl methane diisocyanate, and 15% by weight of oligomeric polyphenyl-polymethylene polyisocyanates were reacted together in a closed mold. Mold release time: 8 minutes.

A molded foam product having the following mechanical properties was obtained:

| | | | |
|---|---|---|---|
| Gross density | DIN 53420 | (kg/m$^3$) | 44 |
| Tensile strength | DIN 53571 | (KPa) | 130 |
| Elongation at break | DIN 53571 | (%) | 150 |

| -continued | | | |
|---|---|---|---|
| Compression strength | DIN 53577 | (KPa) | 5.4 |

EXAMPLE 2

(A) 100 parts by weight of a polypropylene glycol which had been started on trimethylolpropane and modified with ethylene oxide, having a hydroxyl number of 28 and 85% of primary hydroxyl end groups,
  2.7 parts by weight of water,
  0.33 parts by weight of diazabicyclo-2,2,2-octane,
  0.1 parts by weight of 2,2'dimethylamino diethyl ether,
  0.5 parts by weight of N-methylmorpholine,
  0.02 parts by weight of dibutyl tindilaurate,
  1.5 parts by weight of glycerol, and
  8 parts by weight of trichlorofluoromethane and
(B) 54.0 parts by weight of a polyisocyanate mixture consisting of 5% by weight of 2,4' diphenyl methane diisocyanate, 80% by weight of 4,4' diphenyl methane diisocyanate, and 15% by weight of oligomeric polyphenyl-polymethylene polyisocyanates were reacted together in a closed mold. Mold release time: 1 minute.

The molded foam product having the following mechanical properties was obtained:

| Gross density | DIN 53420 | (kg/m³) | 43 |
|---|---|---|---|
| Tensile strength | DIN 53571 | (KPa) | 105 |
| Elongation at break | DIN 53571 | (%) | 130 |
| Compression strength | DIN 53577 | (KPa) | 5.8 |

EXAMPLE 3

(A) 100 parts by weight of a polypropylene glycol which has been started on trimethylolpropane and modified with ethylene oxide, having a primary hydroxyl end group content of 75% and a hydroxyl number of 35,
  2.7 parts by weight of water,
  0.33 parts by weight of 1,4 diazabicyclo-2,2,2-octane,
  0.06 parts by weight of 2,2'dimethylamino diethyl ether,
  0.5 parts by weight of N-methylmorpholine,
  0.2 parts by weight of dibutyl tindilaurate,
  1.5 parts by weight of glycerol, and
  8 parts by weight of trichlorofluoromethane, and
(B) 50.4 parts by weight of a mixture of 80% by weight of polyisocyanate mixture consisting of
  10% by weight of 2,4' diphenyl methane diisocyanate
  75% by weight of 4,4' diphenyl methane diisocyanate, and
  15% by weight of oligomeric polyphenyl-polymethylene polyisocyanate; 20% by weight of tolylene diisocyanate (2,4-:2,6-isomer as 80:20% by weight)
were reacted together in a closed mold. Mold release time: 1 minute, 30 seconds.

A molded foam product having the following mechanical properties was obtained:

| Gross density | DIN 53420 | (kg/m³) | 42.5 |
|---|---|---|---|
| Tensile strength | DIN 53571 | (KPa) | 85 |
| Elongation at break | DIN 53571 | (%) | 145 |
| Compression strength | DIN 53577 | (KPa) | 4.7 |

EXAMPLE 4

(A) 100 parts by weight of a polypropylene glycol which has been started on glycerol and modified with ethylene oxide, having a primary hydroxyl end group content of 80% and a hydroxyl number of 28,
  3.0 parts by weight of water,
  0.55 parts by weight of 1,4 diazabicyclo-2,2,2-octane,
  0.06 parts by weight of 2,2'dimethylamino diethyl ether, and
  5 parts by weight of trichlorofluoromethane and
(B) 51.75 parts by weight of a polyisocyanate mixture consisting of
  26% by weight of 2,4' diphenyl methane diisocyanate,
  64% by weight of 4,4' diphenyl methane diisocyanate, and
  10% by weight of oligomeric polyphenyl-polymethylene polyisocyanates
were reacted together in a closed mold. Mold release time: 2 minutes, 30 seconds, A molded foam product having the following mechanical properties was obtained:

| Gross density | DIN 53420 | (kg/m³) | 56 |
|---|---|---|---|
| Tensile strength | DIN 53571 | (KPa) | 200 |
| Elongation at break | DIN 53571 | (%) | 185 |
| Compression strength | DIN 53577 | (KPa) | 6.8 |

When the same reaction mixture is produced via the free rise technique, the resulting foam had the following mechanical properties:

| Gross density | DIN 53420 | (kg/m³) | 44 |
|---|---|---|---|
| Tensile strength | DIN 53571 | (KPa) | 110 |
| Elongation at break | DIN 53571 | (%) | 180 |
| Compression strength | DIN 53577 | (KPa) | 3.2 |

EXAMPLE 5

(A) 100 parts by weight of a polypropylene glycol which has been started on trimethylolpropane and modified with ethylene oxide, having a primary hydroxyl end group content of 80% and a hydroxyl number of 28,
  2.7 parts by weight of water,
  0.20 parts by weight of 1,4 diazabicyclo-2,2,2-octane,
  0.06 parts by weight of 2,2'-dimethylamino diethyl ether, and
  5 parts by weight of trichlorofluoromethane and
(B) 48.8 parts by weight of a polyisocyanate mixture consisting of
  10% by weight of 2,4' diphenyl methane diisocyanate,
  60% by weight of 4,4' diphenyl methane diisocyanate, and
  30% by weight of oligomeric polyphenyl-polymethylene polyisocyanates
were reacted together in a closed mold. Mold release time: 2 minutes.

A molded foam product having the following mechanical properties was obtained:

| Gross density | DIN 53420 | (kg/m³) | 43 |
|---|---|---|---|
| Tensile strength | DIN 53571 | (KPa) | 80 |
| Elongation at break | DIN 53571 | (%) | 105 |

| | | | |
|---|---|---|---|
| Compression strength | DIN 53577 | (KPa) | 3.8 |

EXAMPLE 6

(A) 100 parts by weight of a polypropylene glycol which had been started on trimethylolpropane and modified with ethylene oxide, having a hydroxyl number of 28 with 60% of primary hydroxyl end groups, 3.0 parts by weight of water, 0.5 parts by weight of 1,4 diazabicyclo-2,2,2-octane, 0.06 parts by weight of 2,2'dimethylamino diethyl ether, and 5 parts by weight of trichlorofluoromethane and (B) 51.75 parts by weight of a polyisocyanate mixture consisting of 26% by weight of 2,4' diphenyl methane diisocyanate, 69% by weight of 4,4' diphenyl methane diisocyanate, and 5% by weight of oligomeric polyphenyl-polymethylene polyisocyanates were reacted together in a closed mold. Mold release time: 2 minutes, 30 seconds.

A molded foam product having the following mechanical properties was obtained:

| | | | |
|---|---|---|---|
| Gross density | DIN 53420 | (kg/m³) | 51 |
| Tensile strength | DIN 53571 | (KPa) | 205 |
| Elongation at break | DIN 53571 | (%) | 215 |
| Compression strength | DIN 53577 | (KPa) | 5.4 |

EXAMPLE 7

Preparation of a flexible integral skin foam. 95 parts by weight of a polypropylene glycol which has been started on trimethylolpropane and modified with ethylene oxide, having a primary hydroxyl end group content of 80% and

| | |
|---|---|
| a hydroxyl number of 28, | |
| ethylene glycol | 5 parts by weight, |
| water | 0.4 parts by weight, |
| 1,4diazabicyclo-2,2,2-octane | 0.35 parts by weight, |
| tetramethyl ethylenediamine | 0.5 parts by weight, and |
| trichlorofluoromethane | 8 parts by weight | were stirred together. They were then mixed with 28.0 parts by weight of a polyisocyanate mixture consisting of

| | |
|---|---|
| 2,4'diphenyl methane diisocyanate | 10% by weight |
| 4,4'diphenyl methane diisocyanate | 75% by weight |
| oligomeric polyphenyl-polymethylene polyisocyanates | 15% by weight |

The reaction mixture was poured into a closed mold. A molded foam product having an integral skin (soft integral foam) was obtained. It had the following properties:

| | | | |
|---|---|---|---|
| Gross density | DIN 53420 | (kg/m³) | 105 |
| Tensile strength | DIN 53571 | (KPa) | 135 |
| Elongation at break | DIN 53571 | (%) | 115 |
| Compression resistance | DIN 53577 | (KPa) | 13.5 |

The mold release time was 2 minutes.

EXAMPLE 8

(A) 100 parts by weight of a polypropyleneglycol that has been started on trimethylolpropane, which polypropyleneglycol has been modified with ethyleneoxide so that terminating 80% primary hydroxyl groups result at an OH number of 28, 3.2 parts by weight of water, 0.42 parts by weight of 1,4 diazabicyclo-2,2,2-octane, 0.10 parts by weight of 2,2'dimethylamino diethyl ether, 5 parts by weight of trichlorofluoromethane, and (B) 54.8 parts by weight of a polyisocyanate mixture consisting of 23 weight-% 2,4' diphenyl methane diisocyanate, 62 weight-% 4,4' diphenyl methane diisocyanate, 15 weight-% oligomeric polyphenyl-polymethylene polyisocyanates, were reacted together in a closed mold. Mold release time: 2 minutes, 30 seconds.

A flexible foam with the following properties is obtained:

| | | | |
|---|---|---|---|
| Density | DIN 53420 | (kg/m³) | 43 |
| Tensile Test | DIN 53571 | (KPa) | 125 |
| Ultimate Elongation Test | DIN 53571 | (%) | 155 |
| Compressive Test | DIN 53577 | (KPa) | 5.2 |

EXAMPLE 9 (Comparison)

(A) 100 parts by weight of a polypropylene glycol that has been started on trimethylol propane, which polypropylene glycol has been modified with ethyleneoxide so that terminating 80% primary hydroxyl groups result at an OH number of 28, 3.2 parts by weight of water, 0.18 parts by weight of 1,4 diazabicyclo-2,2,2-octane, 0.10 parts by weight of 2,2'-dimethylamino diethylether, 5 parts by weight of trichlorofluoromethane, and (B) 54.8 parts by weight of a polyisocyanate mixture, consisting of 27 weight-% 2,4' diphenyl methane diisocyanate, 58 weight-% 4,4' diphenyl methane diisocyanate, 15 weight-% oligomeric polyphenyl-polymethylene polyisocyanates were reacted together in a closed mold. Mold release time: 5 minutes.

A flexible foam with the following mechanical properties is obtained:

| | | | |
|---|---|---|---|
| Density | DIN 53420 | (kg/m³) | 45 |
| Tensile Test | DIN 53571 | (KPa) | 140 |
| Ultimate Elongation Test | DIN 53571 | (%) | 140 |
| Compressive Test | DIN 53577 | (KPa) | 5.6 |

The isocyanate mixture used in all examples has an isocyanate content 32,5±0,5% by weight.

What is claimed is:

1. In a process for the production of molded cold setting, flexible foams, having a cellular structure on the surface thereof, which foams contain urethane groups by the reaction in a mold of polyethers with a molecular weight of 400 to 10,000 which contain at least two hydroxyl groups and in which at least 10% by weight of the hydroxyl groups are primary hydroxyl groups, mixed with a mixture of diphenyl methane diisocyanates and oligomeric polyphenylpolymethylene polyisocyanates in the presence of blowing agents and in the presence of one or more amine catalysts and optionally other catalysts and foaming aids, the improvement wherein the mixture of diphenyl methane diisocyanates and polyphenyl-polymethylene polyisocyanates is substantially free of carbodiimide groups, has an isocyanate content greater than 30%, and contains from 60 to 90% by weight of 4,4′ diphenyl methane diisocyanate and from 3 to 30% by weight of 2,4′ diphenyl methane diisocyanate wherein the reaction is carried out in the absence of foam stabilizers and wherein the amine catalysts are selected from the group consisting of 1,4 diazabicyclo-2,2,2-octane, 2,2′dimethylamino diethyl ether, tetramethyl ethylene diamine, and N-methyl morpholine.

2. The process of claim 1, wherein said mixture contains 65–80% by weight of 4,4′ diphenyl methane diisocyanate and 10–30% by weight of 2,4′ diphenyl methane diisocyanate.

3. The urethane group containing foam produced according to the process of claim 1.

* * * * *